No. 757,862. PATENTED APR. 19, 1904.
O. H. CLOYD.
CULTIVATOR.
APPLICATION FILED APR. 14, 1903.
NO MODEL. 2 SHEETS—SHEET 1.
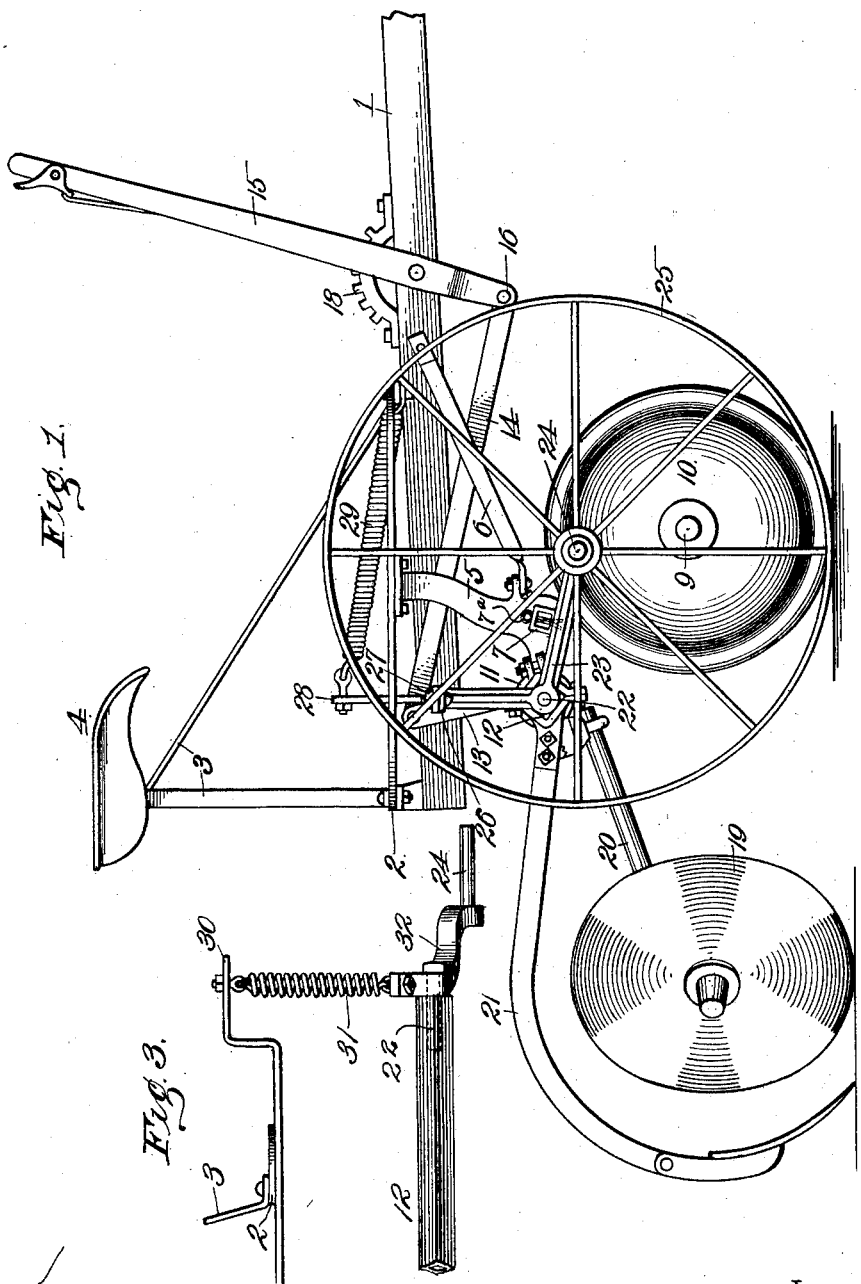
Witnesses:
A. McArthur
H. C. Rodgers.
Inventor:
Oliver H. Cloyd
By George H. Thorpe
Atty.

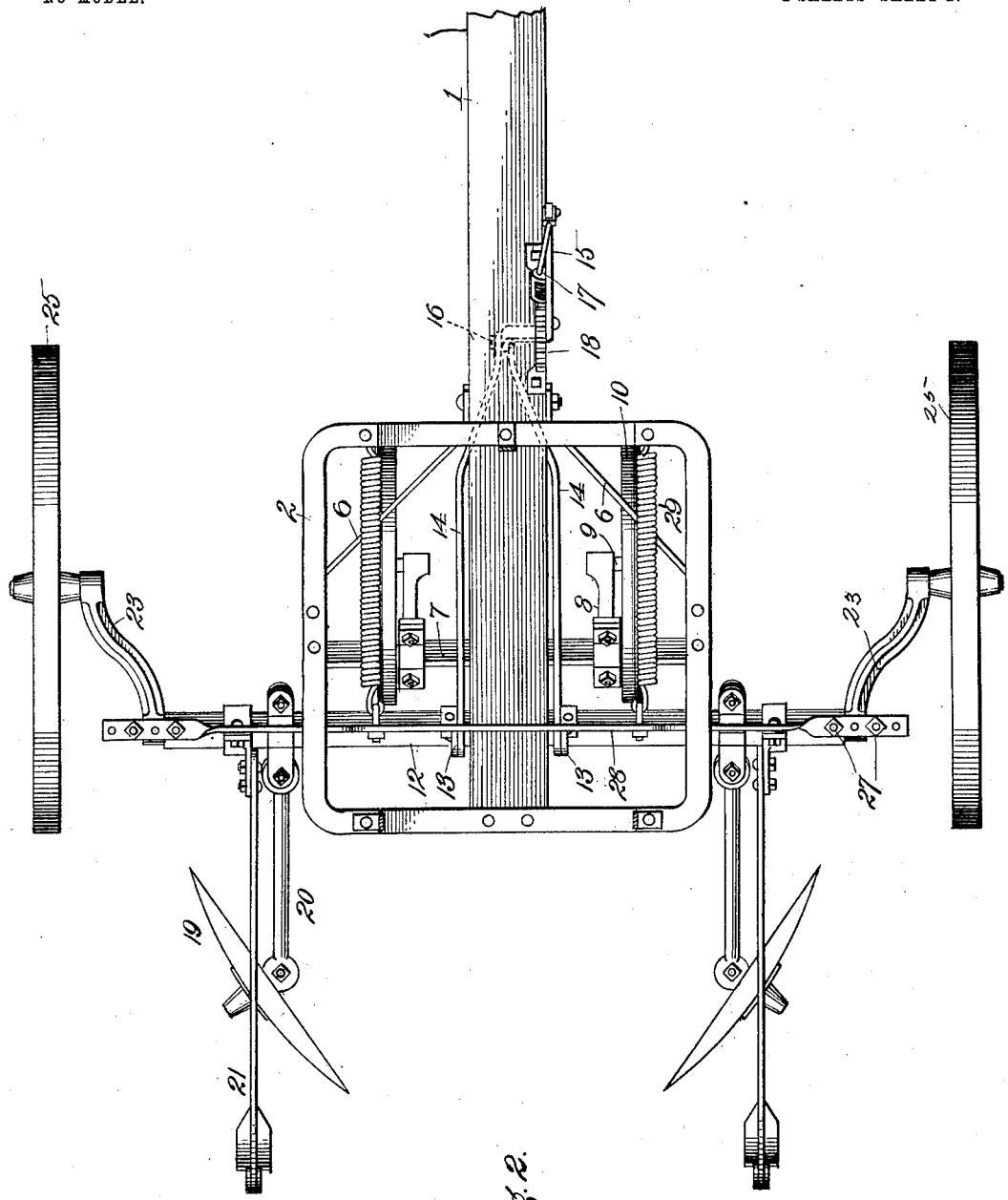

No. 757,862. Patented April 19, 1904.

UNITED STATES PATENT OFFICE.

OLIVER H. CLOYD, OF KANSAS CITY, MISSOURI, ASSIGNOR TO THOMAS E. GAINES, OF KANSAS CITY, MISSOURI.

CULTIVATOR.

SPECIFICATION forming part of Letters Patent No. 757,862, dated April 19, 1904.

Application filed April 14, 1903. Serial No. 152,535. (No model.)

*To all whom it may concern:*

Be it known that I, OLIVER H. CLOYD, a citizen of the United States, residing at Kansas City, in the county of Jackson and State of Missouri, have invented certain new and useful Improvements in Cultivators, of which the following is a specification.

My invention relates to single-row cultivators; and my object is to produce a cultivating-machine of type equipped with spring-depressed wheels for preventing the machine from tipping over, especially in turning at the end of a row, which is positive and reliable in operation and of simple, strong, durable, and inexpensive construction.

To this end the invention consists in certain novel and peculiar features of construction and organization, as hereinafter described and claimed, and in order that it may be fully understood reference is to be had to the accompanying drawings, in which—

Figure 1 is a side elevation of a cultivator embodying my invention. Fig. 2 is a top plan view of the same. Fig. 3 is a detail view of a modified form of the means for holding the guard-wheels yieldingly depressed.

In the said drawings, 1 designates the tongue, and 2 a rectangular frame mounted thereon and surmounted by the braces 3, supporting the seat 4.

5 designates castings (one only appearing) depending from opposite sides of the frame 2 and connected to the tongue by converging braces 6.

7 is a hollow square cross-bar rigidly secured in castings 5 and held from longitudinal movement by spring-cotters 7ª or otherwise, and 8 represents depending arms clamped rigidly on said rod and provided with stub-shafts 9, on which the ground-wheels 10 are journaled in the customary or any preferred manner.

Castings 5 are provided with rearwardly-projecting arms terminating in circular eyes 11, forming journals wherein the square shaft 12 will turn, the turning movement of said shaft being effected through the medium of the rigid upwardly-projecting arms 13, the links 14, and the lever 15, to which the forward ends of said links are pivoted below the tongue, as at 16, said lever having the usual spring-catch 17 for engagement with sector 18, secured to the tongue.

19 designates the disks mounted in the customary or any preferred manner on the rear ends of arms 20, secured as shown or in any other suitable manner to the rock-shaft 12 in order that rearward movement of the lever shall raise the disks from the ground and forward movement of the lever shall lower the disks, said movement of the disks being accompanied by the shovel-carrying beams 21, also rigidly clamped upon said shaft, it being understood, of course, that the disks and shovel-beams may be stationed at different points on the shaft for the purpose of cultivating the ground at different distances apart and that the connections between the disks and shaft are such that the former may have the various adjustments common in this class of machine, and therefore unnecessary to describe herein.

The above describes a type of machine patented and now on the market and to which claims are made only in combination with the new features of the machine, these new features being as follows: 22 designates pins journaled in the ends of rock-shaft 12, and 23 bell-crank levers secured on said pins at the ends of said shaft, the forwardly-projecting arms of said levers being provided with outwardly-projecting stub-shafts 24, upon which the guard-wheels 25 are journaled in any suitable manner. The upwardly-projecting arms of the bell-crank levers terminate in laterally-projecting arms 26, to which are bolted rigidly, as at 27, the opposite ends of the metallic frame, which serves to tie pins 22 together and hold them reliably in the rock-shaft. Said frame is provided with a central arched portion 28, projecting up through the rectangular frame 2 and connected by retractile springs 29 to the front portion of said frame 2, the arrangement being such that said springs tend to tilt the arch forwardly, and thereby hold the guard-wheels upon the ground with a yielding pressure, the object of such pressure being to permit the wheels to rise against the resistance of said springs when necessary to override obstructions in their paths, and that without raising the cultivating appliances or otherwise interfering with the proper cultivation of the soil. The springs also coöperate with the gravitative tendency of the wheels in compelling the latter to follow depressions in the ground, to the end that they may be in a position at all times to act as a guard against the overturning of the machine, this danger being of course greatest when the machine is turning at the end of a row, as when performing its cultivating function the embedded disks and shovels are in themselves a sufficient guard against tilting action.

In the modification shown in Fig. 3 the rear bar of frame 2 is extended laterally and terminates in goosenecks 30, (one only of which appears,) and secured to said goosenecks are springs 31, the lower ends of said springs being secured to the rear ends of rock-levers 32, pivoted in any suitable manner on rock-shaft 12, the front ends of said rock-levers being adapted to be equipped with the wheels 25, as described with reference to the bell-crank levers of Figs. 1 and 2.

In practice the upward pull of springs 31 on the rear ends of the rock-levers serves to hold the wheels at the front ends of the levers yieldingly depressed.

As the functions of the various parts have been explained in connection with the detail description, a recapitulation of the operation is deemed unnecessary, and while the preferred embodiments of the invention have been shown and described it is apparent that it may be varied in form, proportion, detail construction, and arrangement of the parts without departing from its spirit and scope or sacrificing any of its advantages, and it is to be further noted that the parts described as new and useful may be manufactured as a component part of a single-row cultivator or may be manufactured independently thereof for use as an attachment to one gang of a straddle-row cultivator of any suitable or preferred type. It will also be noted that the construction disclosed by Fig. 3 permits the guard-wheels independent vertical operation, so that one may override an obstruction while the other is traversing a depression, the result being that there is no tendency toward withdrawing the cultivating appliances out of or forcing them deeper into the ground.

Having thus described the invention, what I claim as new, and desire to secure by Letters Patent, is—

1. A single-row cultivator, comprising a seat-supporting frame, a transverse rock-shaft, cultivating appliances, and a pair of ground-wheels below said frame, in combination with rock-levers pivotally mounted on the rock-shaft to operate independently thereof, and provided at their front ends with outturned ends, large guard-wheels journaled on said ends, at the outer sides of the ground-wheels, and means for holding the front ends of said levers yieldingly depressed.

2. A single-row cultivator, comprising a seat-supporting frame, a transverse rock-shaft, cultivating appliances, and a pair of ground-wheels below said frame, in combination with rock-levers pivotally mounted on the rock-shaft to operate independently thereof, and provided at their front ends with outturned ends, large guard-wheels journaled on said ends at the outer sides of the ground-wheels, a transverse frame connecting said levers at the opposite side of their fulcrums from their front ends, and means engaging said frame to hold the guard-wheels yieldingly depressed.

3. A single-row cultivator, comprising a transverse rock-shaft, pins journaled in the ends of the same, rock-levers rigidly secured on the outer ends of said pins, a transverse frame connecting the upper ends of said levers, wheels journaled on the front ends of said levers, and means for holding the wheels yieldingly depressed.

4. A single-row cultivator, comprising a transverse rock-shaft, pins journaled in the ends of the same, rock-levers rigidly secured on the outer ends of said pins, a transverse frame connecting the upper ends of said levers, wheels journaled on the front ends of said levers, and springs connected to said frame and tending to draw the same forwardly.

5. A single-row cultivator, comprising a cross-bar, a transverse rock-shaft, ground-wheel-carrying arms depending from the cross-bar, cultivating appliances connected to the shaft, rock-levers pivoted on said shaft and having outturned front ends, guard-wheels journaled on said ends outward of the ground-wheels, and means for holding said guard-wheels yieldingly depressed.

6. A single-row cultivator, comprising a cross-bar, a transverse rock-shaft, ground-wheel-carrying arms depending from the cross-bar, cultivating appliances connected to the shaft, rock-levers pivoted on said shaft and having outturned front ends, guard-wheels journaled on said ends outward of the ground-wheels, a transverse frame connecting said rock-levers, and means for holding the ground-wheels yieldingly depressed.

7. A single-row cultivator, comprising a tongue, a seat-supporting frame thereon, brackets depending from the frame, a cross-bar carried rigidly by and a rock-shaft journaled in the brackets, ground-wheel-carrying arms secured to the cross-bar, cultivating appliances secured to the shaft, pins journaled in the ends of the shaft, bell-crank levers secured on said pins, and having outturned front ends, guard-wheels journaled on said ends, an arched frame connecting the upper ends of the bell-crank levers, and retractile springs connecting said arched frame to the front portion of the seat-supporting frame.

In testimony whereof I affix my signature in the presence of two witnesses.

OLIVER H. CLOYD.

Witnesses:
SYBLA MILLER,
G. Y. THORPE.